United States Patent
Hashimoto et al.

(10) Patent No.: US 10,036,312 B2
(45) Date of Patent: Jul. 31, 2018

(54) AUXILIARY MACHINE-DRIVING DEVICE FOR VEHICLE

(71) Applicant: Nissan Motor Co., Ltd., Yokohama-shi, Kanagawa (JP)

(72) Inventors: Shin Hashimoto, Kanagawa (JP); Takeshi Yamamoto, Kanagawa (JP); Kenshi Ushijima, Kanagawa (JP); Satoshi Nishii, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/577,813

(22) PCT Filed: Jun. 8, 2015

(86) PCT No.: PCT/JP2015/066451
§ 371 (c)(1),
(2) Date: Nov. 29, 2017

(87) PCT Pub. No.: WO2016/199185
PCT Pub. Date: Dec. 15, 2016

(65) Prior Publication Data
US 2018/0163619 A1    Jun. 14, 2018

(51) Int. Cl.
*F02M 51/00*    (2006.01)
*F02B 67/06*    (2006.01)
(Continued)

(52) U.S. Cl.
CPC .............. *F02B 67/06* (2013.01); *B60K 6/485* (2013.01); *B60W 10/08* (2013.01); *F02N 11/04* (2013.01);
(Continued)

(58) Field of Classification Search
CPC ......... F02B 67/06; F02B 67/04; B60W 10/08; B60W 20/40; B60W 10/06; B60K 6/485;
(Continued)

(56) References Cited

U.S. PATENT DOCUMENTS

| 1,416,569 A | 5/1922 | Minnich |
| 3,202,144 A | 8/1965 | Nicholson et al. |

(Continued)

FOREIGN PATENT DOCUMENTS

| CN | 1683764 A | 10/2005 |
| CN | 101151476 A | 3/2008 |

(Continued)

*Primary Examiner* — Hung Q Nguyen
(74) *Attorney, Agent, or Firm* — Global IP Counselors, LLP

(57) ABSTRACT

An auxiliary machine-driving device has a first idler roller having an outer peripheral surface biased into contact with the outer peripheral surfaces of a motor/generator roller and an engine roller, a second idler roller having an outer peripheral surface biased into contact with the outer peripheral surfaces of the engine roller and a rotating roller, and a third idler roller having an outer peripheral surface biased into contact with the outer peripheral surfaces of the rotating roller and the motor/generator roller. When the engine starts, the engine is started by transmitting the driving force of the motor/generator to the engine via the motor/generator roller, the first idler roller and the engine roller. After the engine starts, power is generated from the driving force of the engine being transmitted to the motor/generator via the engine roller, the second idler roller, the rotating roller, the third idler roller and the motor/generator roller.

4 Claims, 4 Drawing Sheets

(51) Int. Cl.
   *F02N 11/04*   (2006.01)
   *F16H 13/04*   (2006.01)
   *F02N 11/08*   (2006.01)
   *B60K 6/485*   (2007.10)
   *B60W 10/08*   (2006.01)
   *B60W 10/06*   (2006.01)
   *B60W 20/40*   (2016.01)

(52) U.S. Cl.
   CPC ........... *F02N 11/084* (2013.01); *F16H 13/04* (2013.01); *B60W 10/06* (2013.01); *B60W 20/40* (2013.01); *F02N 2300/2002* (2013.01)

(58) Field of Classification Search
   CPC ................. F02N 11/084; F02N 11/04; F02N 2300/2002; F16H 13/04; F02D 29/04; F02D 29/06

See application file for complete search history.

(56) References Cited

U.S. PATENT DOCUMENTS

| | | | |
|---|---|---|---|
| 5,342,248 A * | 8/1994 | Matsubara | F02B 67/10 |
| | | | 474/18 |
| 6,849,025 B2 | 2/2005 | Chikaraishi et al. | |
| 7,124,733 B2 | 10/2006 | Kusumi et al. | |
| 9,212,605 B2 | 12/2015 | Hashimoto et al. | |
| 2003/0221656 A1 * | 12/2003 | Kitamura | F02B 67/06 |
| | | | 123/198 R |

FOREIGN PATENT DOCUMENTS

| | | |
|---|---|---|
| CN | 104541034 A | 4/2015 |
| DE | 373816 | 4/1923 |
| DE | 10301758 A1 | 8/2004 |
| EP | 1464809 A2 | 10/2004 |
| EP | 1703170 A1 | 9/2006 |
| FR | 2865518 A1 | 7/2005 |
| JP | 2002-201975 A | 7/2002 |
| JP | 2008-531946 A | 8/2008 |
| WO | 2004048758 A1 | 6/2004 |
| WO | 2014/038554 A1 | 3/2014 |

* cited by examiner

AUXILIARY MACHINE-DRIVING DEVICE FOR VEHICLE

CROSS-REFERENCE TO RELATED APPLICATIONS

This application is a U.S. National stage application of International Application No. PCT/JP2015/066451, filed Jun. 8, 2015.

BACKGROUND

Field of the Invention

The present invention relates to an auxiliary machine-driving device for a vehicle.

Background Information

As the type of technique therefor, the technique described in Japanese Laid-Open Patent Application No. 2002-201975 (Patent Document 1) below has been disclosed. The document discloses a technique in which, when the engine is running, the engine drives a compressor of an air conditioner and power is generated by the motor, when the engine starts, the engine is started by the motor, and when the engine is stopped, the compressor is driven by the motor. The engine, the motor and the compressor transmit driving force by having a belt wound around a pulley provided on their respective drive shafts.

SUMMARY

The belt tension is adjusted in accordance with the largest transmitted driving force. In the technique of Patent Document 1 referenced above, when attempting to use the motor as an engine starter, the belt tension would be adjusted in accordance with the cranking torque during an engine start. By increasing the belt tension, the friction between the pulley and the belt increases, and there was the problem that the energy efficiency is reduced in situations other than during an engine start. In view of the problems described above, an object of the present invention is to provide an auxiliary machine-driving device for a vehicle that can improve the energy efficiency when using a motor/generator as an engine starter and a generator.

An auxiliary machine-driving device for a vehicle, comprising a first idler roller that is biased in the direction in which the outer peripheral surface of the first idler roller comes into contact with the outer peripheral surfaces of a motor/generator roller and an engine roller, a second idler roller that is biased in the direction in which the outer peripheral surface of the second idler roller comes into contact with the outer peripheral surfaces of the engine roller and a rotating roller, and a third idler roller that is biased in the direction in which the outer peripheral surface of the third idler roller comes into contact with the outer peripheral surfaces of the rotating roller and the motor/generator roller, wherein, when the engine starts, the engine is started by transmitting the driving force of the motor/generator to the engine via the motor/generator roller, the first idler roller, and the engine roller; and after the engine starts, power is generated by the motor/generator by transmitting the driving force of the engine to the motor/generator via the second idler roller, the rotating roller, the third idler roller, and the motor/generator roller.

Therefore, the present invention can improve energy efficiency.

BRIEF DESCRIPTION OF THE DRAWINGS

Referring now to the drawings, an auxiliary machine-driving device is illustrated for a vehicle.

DETAILED DESCRIPTION OF THE EMBODIMENTS

Figure 1:
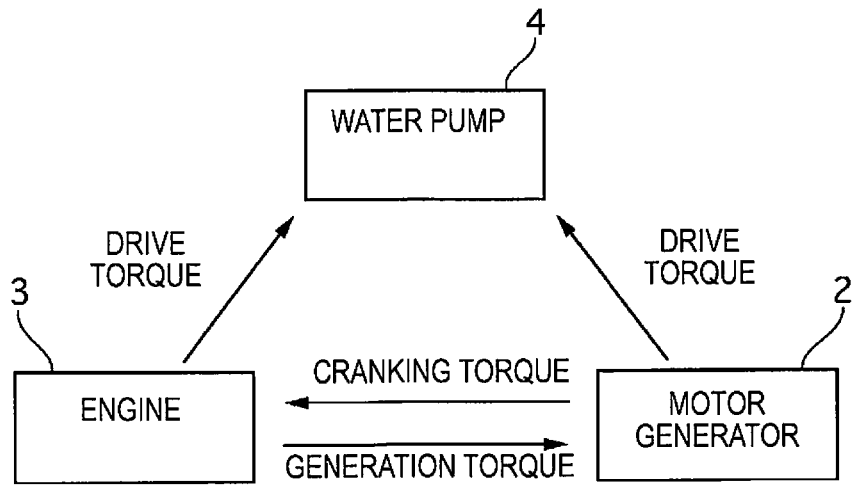
FIG. 1 is a schematic system block diagram of the auxiliary machine-driving device for a vehicle in a first embodiment.

A preferred embodiment an auxiliary machine-driving device for a vehicle is described below based on the embodiment illustrated in the drawings.

First Embodiment

Figure 2:
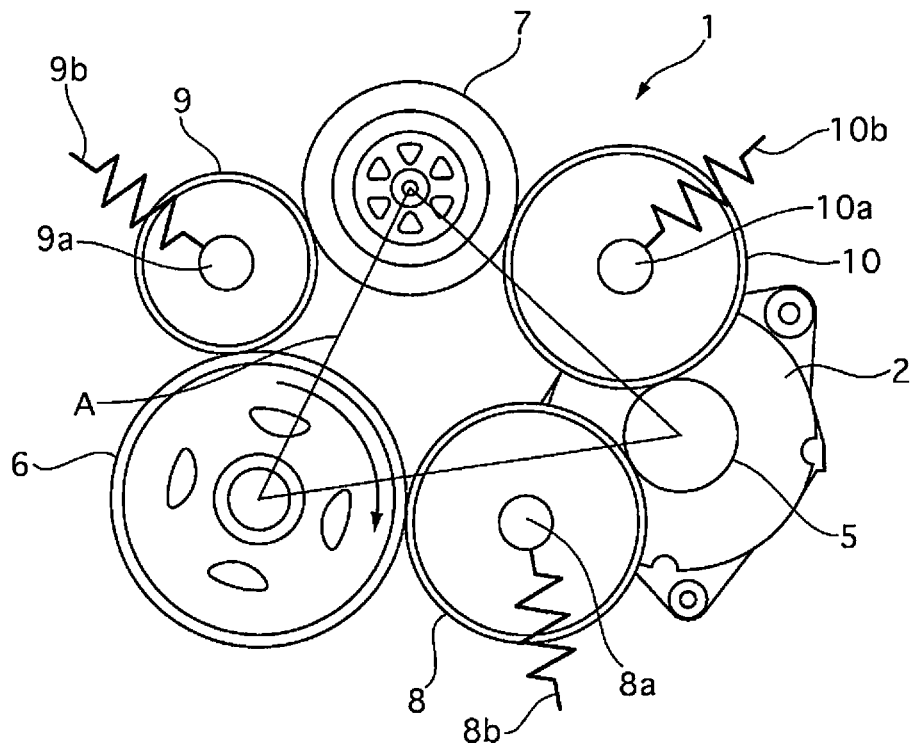
FIG. 2 is a schematic view illustrating the auxiliary machine-driving device for a vehicle of the first embodiment.

The auxiliary machine-driving device 1 for a vehicle of the first embodiment will be described. FIG. 1 is a schematic system block diagram of the auxiliary machine-driving device for a vehicle of the first embodiment. FIG. 2 is a schematic view illustrating the auxiliary machine-driving device for a vehicle of the first embodiment.

The auxiliary machine-driving device 1 for a vehicle transmits a cranking torque from a motor/generator 2 to an engine 3 at the time of an engine start. The engine 3 is started by the cranking torque. The auxiliary machine-driving device 1 for a vehicle transmits a drive torque from the motor/generator 2 to a water pump 4 at the time of an engine start. The water pump 4 is driven by the drive torque and cooling water is provided from the water pump 4 to the engine 3.

The auxiliary machine-driving device 1 for a vehicle transmits a power generation torque from the engine 3 to the motor/generator 2 after an engine start. The motor/generator 2 generates power with the power generation torque and provides electric power to batteries and electrical equipment. The auxiliary machine-driving device 1 for a vehicle transmits drive torque from the engine 3 to the water pump 4 after an engine start. The water pump 4 is driven by the drive torque, and cooling water is provided from the water pump 4 to the engine 3.

The auxiliary machine-driving device 1 for a vehicle carries out the above-described transmission of driving force using a friction drive that makes use of a wedge effect. The auxiliary machine-driving device 1 for a vehicle comprises a motor/generator roller 5 that integrally rotates with a drive shaft of the motor/generator 2, an engine roller 6 that integrally rotates with a crank shaft of the engine 3, and a water pump roller 7 that integrally rotates with a drive shaft of the water pump 4.

The motor/generator roller 5, the engine roller 6 and the water pump roller 7 are arranged so that the order will be the engine roller 6, the water pump roller 7, and the motor/generator roller 5 in the direction of rotation (clockwise direction in FIG. 2) of the engine roller 6.

Between the motor/generator roller 5 and the engine roller 6, a first idler roller 8 that comes into contact with the outer peripheral surfaces of the two is provided. The first idler roller 8 is supported at a rotational center part via a bearing 8a so as to be able to turn freely. The first idler roller 8 is biased in the direction in which the idler roller comes into contact with the outer peripheral surfaces of the motor/generator roller 5 and the engine roller 6 by a biasing member 8b.

Between the engine roller 6 and the water pump roller 7, a second idler roller 9 that comes into contact with the outer peripheral surfaces of the two is provided. The second idler roller 9 is supported at a rotational center part via a bearing 9a so as to be able to turn freely. The second idler roller 9 is biased in the direction in which the idler roller comes into contact with the outer peripheral surfaces of the engine roller 6 and the water pump roller 7 by a biasing member 9b.

Between the water pump roller 7 and the motor/generator roller 5, a third idler roller 10 that comes into contact with the outer peripheral surfaces of the two is provided. The third idler roller 10 is supported at a rotational center part via a bearing 10a so as to be able to turn freely. The third idler roller 10 is biased in the direction in which the idler roller comes into contact with the outer peripheral surfaces of the water pump roller 7 and the motor/generator roller 5 by a biasing member 10b.

The biasing forces of the first idler roller 8, the second idler roller 9, and the third idler roller 10 against the motor/generator roller 5, the engine roller 6, and the water pump roller 7, due to the biasing members 8b, 9b and 10b, respectively, is sufficient if the first idler roller 8, the second idler roller 9, and the third idler roller 10 are not separated from the motor/generator roller 5, the engine roller 6, and the water pump roller 7.

The first idler roller 8, the second idler roller 9, and the third idler roller 10 are provided so that the rotational centers of the first idler roller 8, the second idler roller 9, and the third idler roller 10 are positioned outside of a triangle A that is formed by connecting the rotational centers of the motor/generator roller 5, the engine roller 6, and the water pump roller 7.

The outer peripheral surfaces of the motor/generator roller 5, the engine roller 6, and the water pump roller 7 are formed from an iron-based metal. The outer peripheral surfaces of the first idler roller 8, the second idler roller 9, and the third idler roller 10 are formed from a resin.

The hardness of the resin that is used to form the outer peripheral surfaces of the first idler roller 8, the second idler roller 9, and the third idler roller 10 is less than the hardness of the iron-based metal that forms the outer peripheral surfaces of the motor/generator roller 5, the engine roller 6, and the water pump roller 7.

The strength of the resin that is used to form the outer peripheral surfaces of the first idler roller 8, the second idler roller 9, and the third idler roller 10 is less than the strength of the iron-based metal that forms the outer peripheral surfaces of the motor/generator roller 5, the engine roller 6, and the water pump roller 7.

The material that is used as the resin to form the outer peripheral surfaces of the first idler roller 8, the second idler roller 9, and the third idler roller 10 is such that the coefficients of dynamic friction between the outer peripheral surfaces of the motor/generator roller 5, the engine roller 6, and the water pump roller 7 and the outer peripheral surfaces of the first idler roller 8, the second idler roller 9, and the third idler roller 10 are 0.3 or greater.

Wedge Effect

In the auxiliary machine-driving device 1 for a vehicle of the first embodiment, the transmission of driving force between two rollers is carried out by a force acting in the direction in which an idler roller bites in between the two rollers in contact with the idler roller, thereby generating a wedge effect. The motion of each roller when the wedge effect is generated will be described below.

Figure 3:
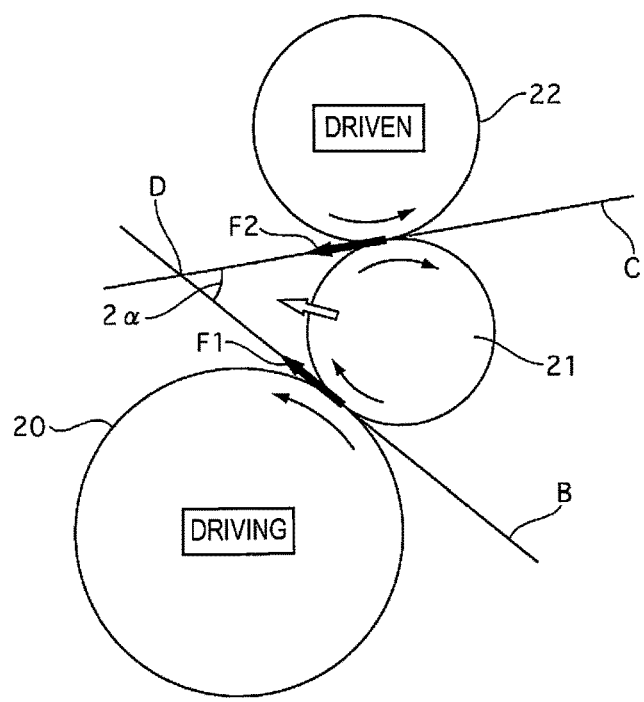
FIG. 3 is a schematic view of the auxiliary machine-driving device for a vehicle of the first embodiment.

FIG. 3 is a schematic view of the auxiliary machine-driving device 1 for a vehicle of the first embodiment. FIG. 3 illustrates the manner in which the driving force of a first roller 20 is transmitted to a second roller 22 via an idler roller 21. A line B tangent to the first roller 20 and the idler roller 21 and a line C tangent to the idler roller 21 and the second roller 22 intersect at point D. The size of the angle formed by the tangent line B and the tangent line C is $2\alpha$.

The driving force of the first roller 20 is transmitted to the idler roller 21. In FIG. 3, when the first roller 20 rotates to the left, the idler roller 21 in contact with the first roller 20 rotates to the right. At this time, the idler roller 21 is pushed in the direction of rotation of the first roller 20 at the point of contact with the first roller 20. A force in the same direction as the direction of rotation of the first roller 20 acts on the idler roller 21 at the point of contact with the first roller 20 (force F1).

The driving force of the idler roller 21 is transmitted to the second roller 22. In FIG. 3, when the idler roller 21 rotates to the right, the second roller 22 in contact with the idler roller 21 rotates to the left. At this time, the second roller 22 is pushed in the direction of rotation of the idler roller 21 at the point of contact with the idler roller 21. A reaction force in the direction opposite to the direction in which the second roller 22 is pushed acts on the idler roller 21 at the point of contact with the second roller 22 (force F2).

A force in the direction towards point D acts on the idler roller 21 because of the force F1 and the force F2. For this reason, the contact load of the idler roller 21 against the first roller 20 and the second roller 22 is increased, and the driving force can be transmitted from the first roller 20 to the second roller 22 via the idler roller 21.

The greater the load of the second roller 22 (the greater the driving force transmitted from the first roller 20 to the second roller 22), the greater the force that acts on the idler roller 21 in the direction towards point D. The friction force F between the first roller 20 and the idler roller 21, or the friction force between the idler roller 21 and the second roller 22, can be obtained by the following formula.

$$F = \tau \times A$$

Here, $\tau$ is the shear stress between the first roller 20 and the idler roller 21, or the shear stress between the idler roller 21 and the second roller 22. A is the contact area of the first roller 20 and the idler roller 21, or the contact area of the idler roller 21 and the second roller 22.

The shear stress τ is determined by the materials of the contact surface of the first roller 20 and the idler roller 21 and the materials of the contact surface of the idler roller 21 and the second roller 22. The contact area A has a high correlation with the contact load of the idler roller 21 against the first roller 20 and the second roller 22 when the aforementioned resin is used for the outer peripheral surface of the idler roller 21, and the greater the contact load, the greater the contact area A.

Figure 4:
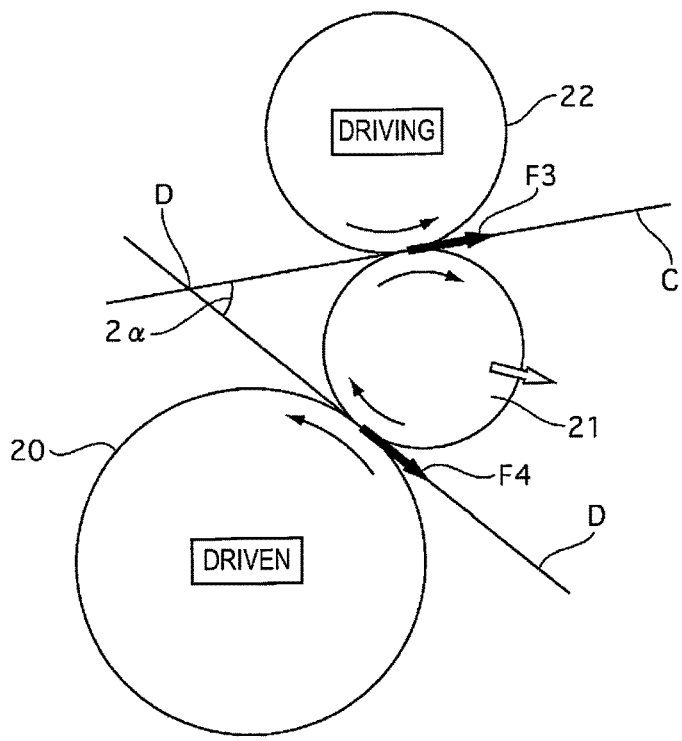
FIG. 4 is a schematic view of the auxiliary machine-driving device for a vehicle of the first embodiment.

FIG. 4 is a schematic view of the auxiliary machine-driving device 1 for a vehicle. FIG. 4 illustrates the manner in which the driving force from the second roller 22 to the first roller 20 is blocked. The driving force of the second roller 22 is transmitted to the idler roller 21. In FIG. 4, when the second roller 22 rotates to the left, the idler roller 21 in contact with the second roller 22 rotates to the right. At this time, the idler roller 21 is pushed in the direction of rotation of the second roller 22 at the point of contact with the second roller 22. A force in the same direction as the direction of rotation of the second roller 22 acts on the idler roller 21 at the point of contact with the second roller 22 (force F3).

The driving force of the idler roller 21 is transmitted to the first roller 20. In FIG. 4, when the idler roller 21 rotates to the right, the first roller 20 in contact with the idler roller 21 rotates to the left. At this time, the first roller 20 is pushed in the direction of rotation of the idler roller 21 at the point of contact with the idler roller 21. A reaction force in the direction opposite to the direction in which the first roller 20 is pushed acts on the idler roller 21 at the point of contact with the first roller 20 (force F4).

A force in the direction away from point D acts on the idler roller 21 due to the force F3 and the force F4. For this reason, the contact load of the idler roller 21 against the first roller 20 and the second roller 22 decreases. Thus, the transmission of the driving force from the second roller 22 to the idler roller 21 and the transmission of the driving force from the idler roller 21 to the first roller 20 are hardly carried out.

In order to generate a wedge effect as described above, the positional relationship of the first roller 20, the idler roller 21, and the second roller 22 must satisfy the following formula.

$$\mu > \tan \alpha$$

Here, $\mu$ is the coefficient of dynamic friction between the first roller 20 and the idler roller 21, and the coefficient of dynamic friction between the idler roller 21 and the second roller 22.

Behavior or the Auxiliary Machine-Driving Device

Figure 5:
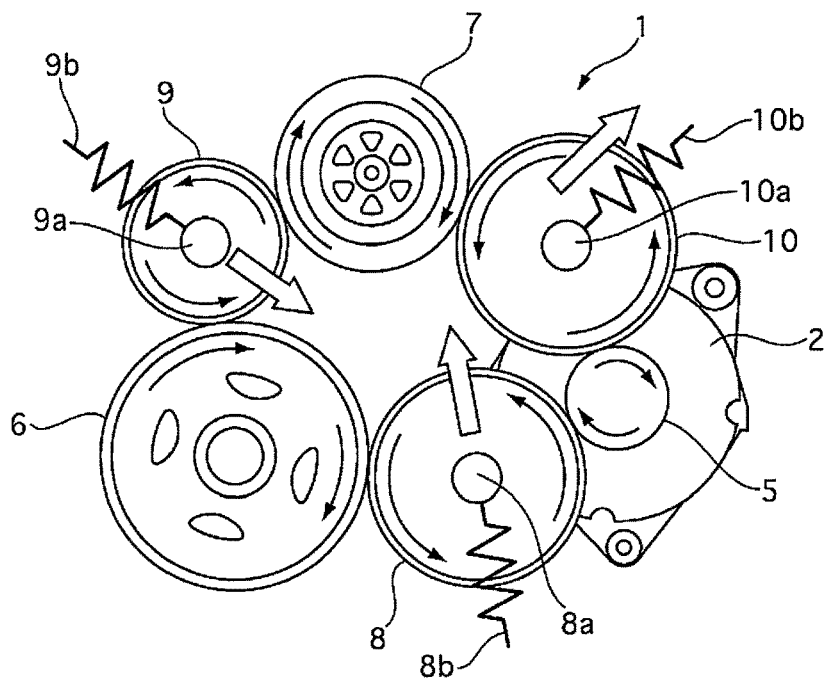
FIG. 5 is a view illustrating the motions of the members of the auxiliary machine-driving device for a vehicle of the first embodiment at the time of an engine start.

FIG. 5 is a view illustrating the motions of the members of the auxiliary machine-driving device 1 for a vehicle at the time of an engine start. When the engine starts, cranking of the engine 3 is carried out with the driving force of the motor/generator 2.

The motor/generator roller 2 is driven, and the motor/generator roller 5 is rotated to the right in FIG. 5. The first idler roller 8 is rotated to the left by the motor/generator roller 5, and the engine roller 6 is rotated to the right by the first idler roller 8. At this time, a force acts on the first idler roller 8 in the direction in which the idler roller bites in between the motor/generator roller 5 and the engine roller 6. As a result, the driving force of the motor/generator 2 is transmitted to the engine 3 via the first idler roller 8.

The engine roller 6 rotates to the right due to the driving force from the motor/generator roller 5. The second idler roller 9 is rotated to the left by the engine roller 6, and the water pump roller 7 is rotated to the right by the second idler roller 9. At this time, a force acts on the second roller 9 in the direction in which the second roller bites in between the engine roller 6 and the water pump roller 7. As a result, part of the driving force that is transmitted from the motor/generator roller 5 to the engine roller 6 is transmitted to the water pump roller 7 via the second idler roller 9.

The third idler roller 10 is rotated to the left by the motor/generator roller 5, and the water pump roller 7 is rotated to the right by the third idler roller 10. At this time, a force acts on the third idler roller 10 in the direction away from in the direction away from the line of contact between the motor/generator roller 5 and the water pump roller 7. As a result, the driving force from the motor/generator roller 5 to the water pump roller 7 via the third idler roller 10 is hardly transmitted.

Figure 6:
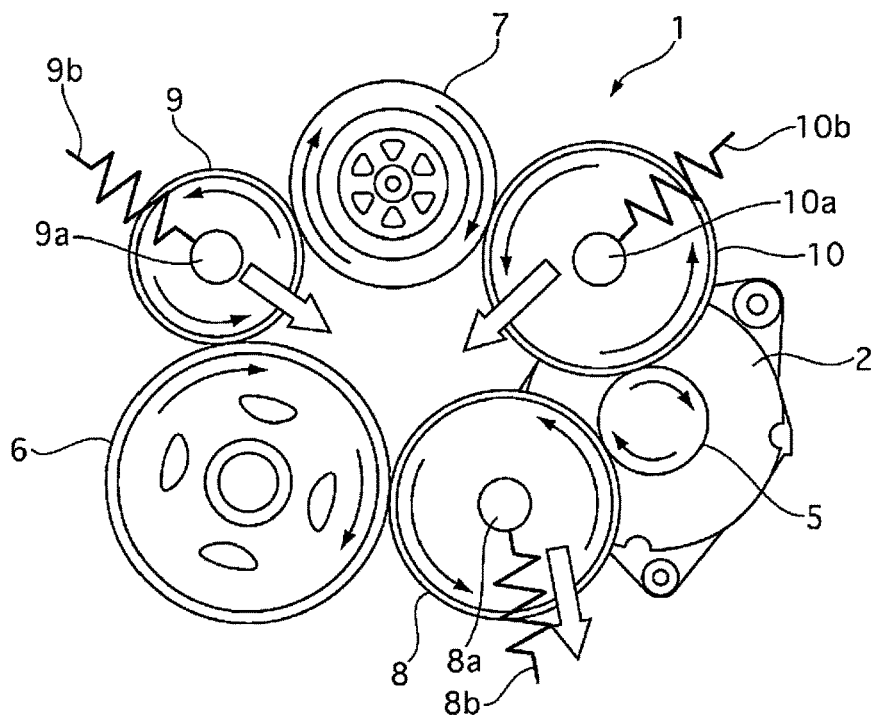
FIG. 6 is a view illustrating the motions of the members of the auxiliary machine-driving device for a vehicle of the first embodiment after an engine start.

FIG. 6 is a view illustrating the motions of the members of the auxiliary machine-driving device 1 for a vehicle after an engine start. After the engine starts, the motor/generator 2 generates power with the driving force of the engine 3.

In FIG. 6, the engine roller 6 is rotated to the right by the driving force of the engine 3. The second idler roller 9 is rotated to the left by the engine roller 6, and the water pump roller 7 is rotated to the right by the second idler roller 9. At this time, a force acts on the second roller 9 in the direction in which the second roller bites in between the engine roller 6 and the water pump roller 7. As a result, the driving force of the engine roller 6 is transmitted to the water pump roller 7 via the second idler roller 9.

The water pump roller 7 is rotated to the right by the driving force from the engine roller 6. The third idler roller 10 is rotated to the left by the water pump roller 7, and motor/generator roller 5 is rotated to the right by the third idler roller 10. At this time, a force acts on the third idler roller 10 in the direction in which the idler roller bites in between the water pump roller 7 and the motor/generator roller 5. As a result, part of the driving force transmitted from the engine roller 6 to the water pump roller 7 is transmitted to the motor/generator roller 5 via the third idler roller 10.

The first idler roller 8 is rotated to the left by the engine roller 6, and motor/generator roller 5 is rotated to the right by the third idler roller 10. At this time, a force acts on the first idler roller 8 in the direction away from the line of contact between the engine roller 6 and the motor/generator roller 5. As a result, the driving force from the engine roller 6 to the motor/generator roller 5 via the first idler roller 8 is hardly transmitted.

Actions

When the driving force transmission between the engine 3 and the auxiliary machine is carried out using a belt and a pulley, the belt tension must increase with the transmitted driving force. By increasing the belt tension, the friction between the belt and the pulley increases, and there was the risk that the energy efficiency would be reduced. As in the first embodiment, when both starting the engine and generating power are carried out by the motor/generator 2, the belt tension must be set high in accordance with the cranking torque of the engine 3 in which the driving force is high. For this reason, the problem of the reduction of energy efficiency is increased.

Thus, in the first embodiment, a first roller 8 that is biased in the direction in which the outer peripheral surface of the first idler roller comes into contact with the outer peripheral surfaces of the motor/generator roller 5 and the engine roller 6, a second idler roller 9 that is biased in the direction in which the outer peripheral surface of the second idler roller comes into contact with the outer peripheral surfaces of the engine roller 6 and the water pump roller 7, and a third idler roller that is biased in the direction in which the outer peripheral surface of the third idler roller comes into contact with the outer peripheral surfaces of the water pump roller 7 and the motor/generator roller 5 are provided. Then, when the engine 3 starts, the engine 3 is started by transmitting the driving force of the motor/generator 2 to the engine 3 via the motor/generator roller 5, the first idler roller 8, and the engine roller 6. Furthermore, after the engine starts, power is generated by the motor/generator 2 by transmitting the driving force of the engine 3 to the motor/generator 2 via the second idler roller 9, the water pump roller 7, the third idler roller 10, and the motor/generator roller 5.

Thus, at the time of an engine start, a wedge effect, in which a force acts on the first idler roller 8 in the direction in which the idler roller bites in between the motor/generator roller 5 and the engine roller 6, can be generated. Since the contact load of the first idler roller 8 against the motor/generator roller 5 and the engine roller 6 is naturally determined in accordance with the load of the engine 3, there is no need to adjust the contact load through a control means.

In addition, after the engine starts, a wedge effect, in which a force acts on the second idler roller 9 in the direction in which the idler roller bites in between the engine roller 6 and the water pump roller 7, can be generated. Furthermore, a wedge effect, in which a force acts on the third idler roller 10 in the direction in which the idler roller bites in between the water pump roller 7 and the motor/generator roller 5, can be generated. The contact load of the second idler roller 9 against the engine roller 6 and the water pump roller 7 is naturally determined in accordance with the load of the water pump 4 and the motor/generator 2. The contact load of the third idler roller 10 against the water pump roller 7 and the motor/generator roller 5 is naturally determined in accordance with the load of the motor/generator 2.

The loads of the motor/generator 2 and the water pump 4 are smaller in comparison with the load of the engine 3 at the time of an engine start. For this reason, the contact load against the engine roller 6 and water pump roller 7 and the contact load against the water pump roller 7 and the motor/generator roller 5 of the second idler roller 9 after the engine starts is smaller than the contact load of the first idler roller 8 against the motor/generator roller 5 and the engine roller 6 at the time of the engine start. Thus, the friction between each of the rollers after the engine starts is smaller than the friction of each of the rollers at the time of the engine start, and the reduction of energy efficiency can be suppressed.

Figure 7:
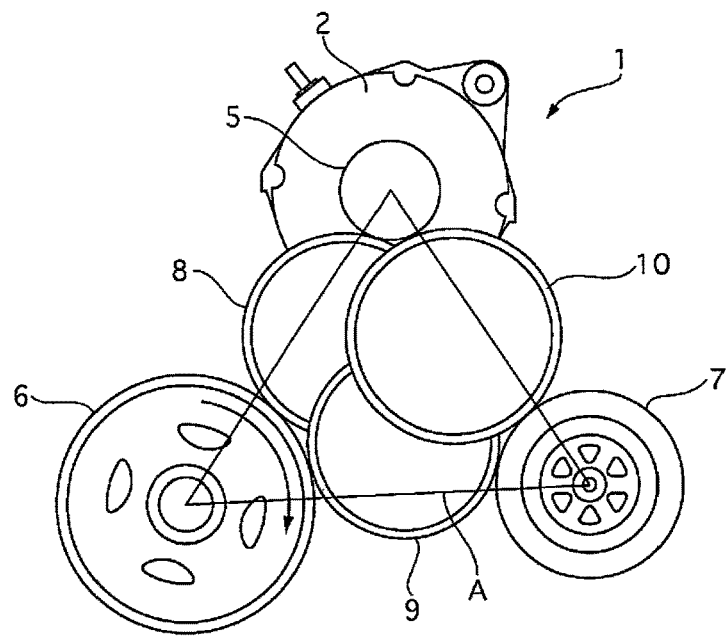
FIG. 7 is a schematic view illustrating an auxiliary machine-driving device of a comparative example.

FIG. 7 illustrates an example in which the engine roller 6, the water pump roller 7, and the motor/generator roller 5 are arranged in that order in the direction opposite to the direction of rotation (counterclockwise direction in FIG. 7) of the engine roller 6.

When arranging the engine roller 6, the water pump roller 7, and the motor/generator roller 5 in that order in the direction opposite to the direction of rotation of the engine roller 6, in order to generate a wedge effect as described above, the rotational centers of the first idler roller 8, the second idler roller 9, and the third idler roller 10 must be disposed to be positioned inside of a triangle A that is formed by connecting the rotational centers of the motor/generator roller 5, the engine roller 6, and the water pump roller 7. When disposing the rotational centers of the first idler roller 8, the second idler roller 9, and the third idler roller 10 to be positioned inside of the triangle A, in order to avoid interference with the idler rollers, the idler rollers must be arranged offset relative to the direction of the axes of rotation. Thus, the size in the axial direction of the auxiliary machine-driving device 1 for a vehicle becomes large.

Thus, in the first embodiment, the engine roller 6, the water pump roller 7, and the motor/generator roller 5 are arranged to be in that order in the direction of rotation of the engine roller 6 when seen from the direction of the axis of rotation of the engine roller 6.

Thus, the rotational centers of the first idler roller 8, the second idler roller 9, and the third idler roller 10 can be provided to be positioned outside of the triangle A that is formed by connecting the rotational centers of the motor/generator roller 5, the engine roller 6, and the water pump roller 7. Since there is no interference when the idler rollers are arranged on a surface that is orthogonal to the axes of rotation, it is not necessary to arrange the idler rollers offset relative to the direction of the axes of rotation. Thus, the size in the axial direction of the auxiliary machine-driving device 1 for a vehicle can be reduced. In addition, since the rotational centers of the first idler roller 8, the second idler roller 9, and the third idler roller 10 are disposed outside of the triangle A, replacement of the idler rollers becomes a simple matter.

With a friction drive that makes use of a wedge effect, transmission of driving force can only be carried out in one direction. However, the auxiliary machine-driving device 1 for a vehicle of the first embodiment is required to transmit a drive torque from the motor/generator 2 to the engine 3 at the time of an engine start, and transmit a drive torque from the engine 3 to the motor/generator 2 after the engine starts. For this reason, two systems of driving force transmission paths must be provided.

In the first embodiment, a water pump 4 that is always driven by the engine 3 is disposed in the path that transmits driving force from the engine 3 to the motor/generator 2. As a result, the driving force transmission system that transmits driving force from the engine 3 to the motor/generator 2 can also be used as the driving force transmission path that transmits driving force from the engine 3 to the water pump 4. Therefore, there is no need to separately provide a driving force transmission path that transmits driving force from the engine 3 to the water pump 4, and a compact size of the auxiliary machine-driving device 1 for a vehicle can be achieved.

In addition, in the first embodiment, the strength of the resin that is used to form the outer peripheral surfaces of the first idler roller 8, the second idler roller 9, and the third idler roller 10 is less than the strength of the iron-based metal that forms the outer peripheral surfaces of the motor/generator roller 5, the engine roller 6, and the water pump roller 7.

Thus, the weakest parts of the auxiliary machine-driving device 1 for a vehicle can be the first idler roller 8, the second idler roller 9, and the third idler roller 10. The first idler roller 8, the second idler roller 9, and the third idler roller 10 are not connected to the auxiliary machine. In addition, although the first idler roller 8, the second idler roller 9, and the third idler roller 10 are biased to come into contact with the motor/generator roller 5, the engine roller 6, and the water pump roller 7, the accuracy of the attachment positions of the first idler roller 8, the second idler roller 9, and the third idler roller 10 need not be very high. Further, the rotational centers of the first idler roller 8, the second idler roller 9, and the third idler roller 10 are disposed outside of the triangle A. Therefore, the first idler roller 8, the second idler roller 9, and the third idler roller 10 are easier to replace than the motor/generator roller 5, the engine roller 6, and the water pump roller 7, and repair of the auxiliary machine-driving device 1 for a vehicle can be done easily.

Effects (1) An auxiliary machine-driving device for a vehicle comprising an engine roller 6 that integrally rotates with a crank shaft of an engine 3, a motor/generator roller 5 that integrally rotates with a rotary shaft of a motor/generator roller 2, a water pump roller 7 (rotating roller) that integrally rotates with the rotary shaft of a water pump 4, a first idler roller 8 that is biased in the direction in which the outer peripheral surface of the first idler roller comes into contact with the outer peripheral surfaces of the motor/generator roller 5 and the engine roller 6, a second idler roller 9 that is biased in the direction in which the outer peripheral surface of the second idler roller comes into contact with the outer peripheral surfaces of the engine roller 6 and the water pump roller 7, and a third idler roller 10 that is biased in the direction in which the outer peripheral surface of the third idler roller comes into contact with the outer peripheral surfaces of the water pump roller 7 and the motor/generator roller 5, wherein, when the engine starts, the engine 3 is started by transmitting the driving force of the motor/generator 2 to the engine via the motor/generator roller 5, the first idler roller 8, and the engine roller 6, and after the engine starts, power is generated by the motor/generator 2 by transmitting the driving force from the engine 3 to the motor/generator 2 via the engine roller 6, the second idler roller 9, the water pump roller 7, the third idler roller 10, and the motor/generator roller 5. Thus, the friction between each of the rollers after the engine starts is smaller than the friction of each of the rollers at the time of an engine start, and the reduction of energy efficiency can be suppressed.

(2) The engine roller 6, the water pump roller 7, and the motor/generator roller 5 are arranged in that order in the direction of rotation of the engine roller 6 when seen from the direction of the axis of rotation of the engine roller 6. Thus, the size in the axial direction of the auxiliary machine-driving device 1 for a vehicle can be reduced.

(3) The water pump roller 7 integrally rotates with the drive shaft of the water pump 4 that provides cooling water to the engine 3. Thus, a compact size of the auxiliary machine-driving device 1 for a vehicle can be achieved.

Other Embodiments

A preferred embodiment of the present invention was described above using one embodiment based on drawings, but specific configurations of the present invention are not limited by the embodiment, and changes to the design made without departing from the scope of the invention are also included in the present invention.

Figure 8:
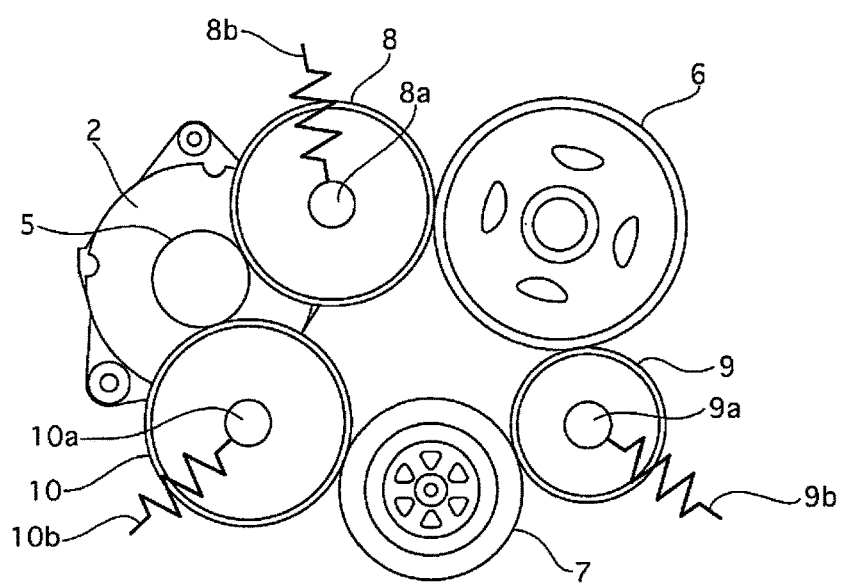
FIG. 8 is a schematic view illustrating an auxiliary machine-driving device for a vehicle of another embodiment.

In the first embodiment, the motor/generator roller 5 is disposed on the right side of the engine roller 6 when seen from the direction of the axes of rotation of the rollers, as illustrated in FIG. 2, but the motor/generator roller 5 may be disposed on the left side of the engine roller 6, as illustrated in FIG. 8.

Other auxiliary machines that are driven synchronously with the engine 3 may be used instead of the water pump 4 of the first embodiment. Or, a fixed axis idler roller may be used without connection to an auxiliary machine.

The invention claimed is:

1. An auxiliary machine-driving device for a vehicle, the auxiliary machine-driving device comprising:
    an engine roller that integrally rotates with a crank shaft of an engine;
    a motor/generator roller that integrally rotates with a rotary shaft of a motor/generator;
    a rotating roller that integrally rotates with a rotary shaft of an auxiliary machine that is driven by the engine or the motor/generator;
    a first idler roller that is biased in a direction in which an outer peripheral surface of the first idler roller comes into contact with outer peripheral surfaces of the motor/generator roller and the engine roller;
    a second idler roller that is biased in a direction in which an outer peripheral surface of the second idler roller comes into contact with outer peripheral surfaces of the engine roller and the rotating roller; and
    a third idler roller that is biased in a direction in which an outer peripheral surface of the third idler roller comes into contact with the outer peripheral surfaces the rotating roller and the motor/generator roller;
    wherein
    when the engine starts, the engine is started by transmitting the driving force of the motor/generator to the engine via the motor/generator roller, the first idler roller and the engine roller, and after the engine starts, power is generated by the motor/generator by transmitting the driving force of the engine to the motor/generator via the engine roller, the second idler roller, the rotating roller, the third idler roller and the motor/generator roller.

2. The auxiliary machine-driving device as recited in claim 1, wherein
    the engine roller, the rotating roller and the motor/generator roller are arranged in that order in a direction of rotation of the engine roller when viewed from a direction of an axis of rotation of the engine roller.

3. The auxiliary machine-driving device as recited in claim 1, wherein
    the rotating roller integrally rotates with a drive shaft of a water pump that provides cooling water to the engine.

4. The auxiliary machine-driving device as recited in claim 2, wherein
    the rotating roller integrally rotates with a drive shaft of a water pump that provides cooling water to the engine.

* * * * *